(12) United States Patent
Eipper et al.

(10) Patent No.: US 9,162,707 B2
(45) Date of Patent: Oct. 20, 2015

(54) BODY COMPONENT

(71) Applicant: Daimler AG, Stuttgart (DE)

(72) Inventors: Konrad Eipper, Rottenburg (DE); Peter Feuser, Unterensingen (DE); Dietmar Kallfass, Ammerbuch (DE); Uwe Lobenwein, Stuttgart (DE); Patrick Schuster, Stuttgart (DE); Thomas Schweiker, Fellbach (DE); Kai Von Strzemie, Leutenbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/363,122

(22) PCT Filed: Oct. 24, 2012

(86) PCT No.: PCT/EP2012/004437
§ 371 (c)(1),
(2) Date: Jun. 5, 2014

(87) PCT Pub. No.: WO2013/083218
PCT Pub. Date: Jun. 13, 2013

(65) Prior Publication Data
US 2015/0048654 A1    Feb. 19, 2015

(30) Foreign Application Priority Data
Dec. 6, 2011    (DE) .......... 10 2011 120 180

(51) Int. Cl.
*B60J 7/00* (2006.01)
*B62D 25/04* (2006.01)
*B62D 29/00* (2006.01)

(52) U.S. Cl.
CPC .............. *B62D 25/04* (2013.01); *B62D 29/004* (2013.01)

(58) Field of Classification Search
CPC ... B22F 2998/00; B29C 70/086; B29C 66/71; B29C 66/7212; C08L 95/00; B29D 99/0021; Y02T 50/433; B25C 1/06; B25C 1/003; B25C 1/008
USPC .............. 296/193.06, 146.6, 187.12, 203.03, 296/209, 30; 156/245; 428/295.4; 280/610
See application file for complete search history.

(56) References Cited

U.S. PATENT DOCUMENTS 3,526,426 A * 9/1970 Wessells .................... 296/96.21
3,724,153 A * 4/1973 Wessells et al. ......... 296/203.03
(Continued)

FOREIGN PATENT DOCUMENTS

| CN | 1205923 A | 1/1999 |
|---|---|---|
| CN | 101801767 A | 8/2010 |

(Continued)

OTHER PUBLICATIONS

International Search Report dated Feb. 12, 2013 with English translation (five (5) pages).

(Continued)

*Primary Examiner* — Kiran B Patel
(74) *Attorney, Agent, or Firm* — Crowell & Moring LLP

(57) ABSTRACT

A motor vehicle column includes an inner shell and an outer shell made from a metal, which are connected to each other in respective flange regions and which enclose a hollow space between them. In the hollow space a reinforcement element having a basic body made from a fiber composite plastic is arranged to strengthen the body component. The reinforcement element includes a metallic insert, which connects the reinforcement element to the inner and/or outer shell.

9 Claims, 1 Drawing Sheet

(56) References Cited

U.S. PATENT DOCUMENTS

Figure 1:
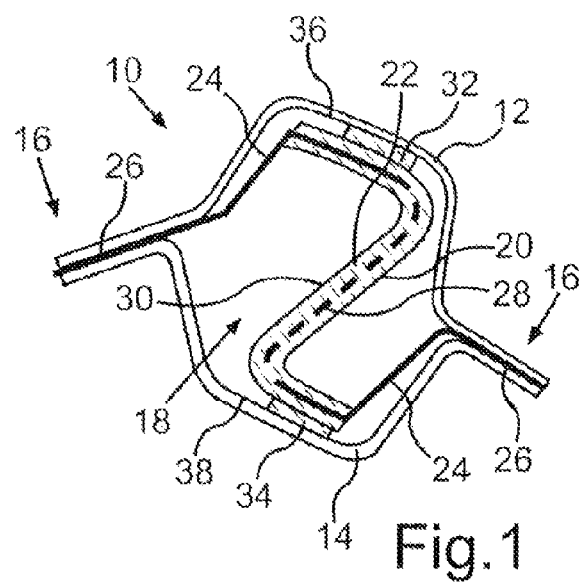

| | | | | |
|---|---|---|---|---|
| 4,252,364 | A * | 2/1981 | Toyama et al. | 296/203.01 |
| 4,435,240 | A * | 3/1984 | Knaus et al. | 156/242 |
| 4,826,238 | A * | 5/1989 | Misono et al. | 296/209 |
| 4,848,835 | A * | 7/1989 | DeRees | 296/204 |
| 5,125,715 | A * | 6/1992 | Kijima | 296/187.09 |
| 5,173,142 | A * | 12/1992 | Billiu | 156/245 |
| 5,212,208 | A | 5/1993 | Soderberg | |
| 5,246,264 | A * | 9/1993 | Yoshii | 296/203.03 |
| 5,338,588 | A * | 8/1994 | Billiu | 428/36.3 |
| 5,388,885 | A * | 2/1995 | Warren | 296/203.03 |
| 5,641,194 | A * | 6/1997 | Honma et al. | 296/203.03 |
| 5,653,495 | A * | 8/1997 | Bovellan et al. | 296/203.03 |
| 5,722,715 | A * | 3/1998 | Patel et al. | 296/187.05 |
| 5,988,733 | A * | 11/1999 | Kamo et al. | 296/187.05 |
| 6,270,600 | B1 * | 8/2001 | Wycech | 156/79 |
| 6,296,301 | B1 * | 10/2001 | Schroeder et al. | 296/187.02 |
| 6,341,467 | B1 * | 1/2002 | Wycech | 52/834 |
| 6,554,350 | B2 * | 4/2003 | Takahara | 296/187.05 |
| 6,786,533 | B2 * | 9/2004 | Bock et al. | 296/187.02 |
| 6,793,183 | B1 * | 9/2004 | Hand et al. | 244/158.1 |
| 6,854,767 | B2 * | 2/2005 | Yakata et al. | 280/808 |
| 6,854,795 | B2 * | 2/2005 | Yamazaki et al. | 296/209 |
| 6,883,843 | B2 * | 4/2005 | Van Damme et al. | 293/120 |
| 7,070,228 | B2 * | 7/2006 | Shimizu et al. | 296/187.01 |
| 7,318,873 | B2 * | 1/2008 | Czaplicki et al. | 156/71 |
| 7,963,588 | B2 * | 6/2011 | Kanagai et al. | 296/187.12 |
| 8,087,916 | B2 * | 1/2012 | Kanie et al. | 425/4 R |
| 8,282,154 | B2 * | 10/2012 | Maruyama | 296/193.05 |
| 8,308,227 | B2 | 11/2012 | Tsuruta et al. | |
| 8,530,015 | B2 * | 9/2013 | Mendiboure et al. | 428/36.5 |
| 8,545,956 | B2 * | 10/2013 | Hoefflin | 428/55 |
| 8,662,575 | B2 * | 3/2014 | Tamura | 296/209 |
| 8,888,173 | B2 * | 11/2014 | Nydam et al. | 296/203.03 |
| 8,911,008 | B1 * | 12/2014 | Campbell et al. | 296/213 |
| 8,926,005 | B2 * | 1/2015 | Barz et al. | 296/193.06 |
| 2003/0090129 | A1 * | 5/2003 | Riley et al. | 296/203.03 |
| 2005/0050710 | A1 * | 3/2005 | Eipper | 29/463 |
| 2005/0134087 | A1 * | 6/2005 | Behr et al. | 296/187.01 |
| 2005/0175400 | A1 * | 8/2005 | Behr et al. | 403/267 |
| 2006/0005503 | A1 * | 1/2006 | Bladow et al. | 52/735.1 |
| 2007/0187995 | A1 * | 8/2007 | Mouch et al. | 296/209 |
| 2010/0098969 | A1 * | 4/2010 | Hashimura et al. | 428/653 |
| 2010/0109385 | A1 * | 5/2010 | Yamada et al. | 296/209 |
| 2010/0173126 | A1 * | 7/2010 | Malek et al. | 428/138 |
| 2011/0309657 | A1 * | 12/2011 | Hutter et al. | 296/193.06 |
| 2012/0119546 | A1 * | 5/2012 | Honda et al. | 296/203.01 |
| 2013/0049391 | A1 * | 2/2013 | Kurogi et al. | 296/30 |
| 2013/0049405 | A1 * | 2/2013 | Kurogi et al. | 296/203.01 |
| 2013/0108878 | A1 * | 5/2013 | Kleine et al. | 428/457 |
| 2013/0119647 | A1 * | 5/2013 | Tanaka et al. | 280/730.1 |
| 2013/0257098 | A1 * | 10/2013 | Matsuda et al. | 296/187.12 |
| 2014/0084635 | A1 * | 3/2014 | Matsuda et al. | 296/205 |
| 2014/0158567 | A1 * | 6/2014 | Park et al. | 206/335 |
| 2014/0225399 | A1 * | 8/2014 | Ono | 296/210 |
| 2014/0265443 | A1 * | 9/2014 | Meaige et al. | 296/187.02 |
| 2014/0265448 | A1 * | 9/2014 | Bartlett et al. | 296/193.06 |
| 2015/0028627 | A1 * | 1/2015 | Fellague | 296/187.13 |
| 2015/0042126 | A1 * | 2/2015 | Matsuda et al. | 296/187.12 |

FOREIGN PATENT DOCUMENTS

| | | | |
|---|---|---|---|
| DE | 10 2004 012 399 | A1 | 10/2005 |
| DE | 10 2005 003 978 | A1 | 8/2006 |
| DE | 10 2007 010 341 | A1 | 7/2008 |
| DE | 10 2007 026 762 | A1 | 2/2009 |
| DE | 10 2011 014 454 | A1 | 11/2011 |

OTHER PUBLICATIONS

German-language Written Opinion (PCT/ISA/237) dated Feb. 12, 2013 (four (4) pages).
Chinese Office Action dated Jul. 29, 2015, with partial English translation (Seven (7) pages).

* cited by examiner

BODY COMPONENT

BACKGROUND AND SUMMARY OF THE INVENTION

Exemplary embodiments of the present invention relate to a body component, in particular a column for the motor vehicle.

Body components in so-called monocoque construction have many uses in the construction of motor vehicles, in particular for columns and carrier parts, as well as for doors, flaps or similar. German patent document DE 10 2004 012 399 A1 discloses a vehicle column in monocoque construction. Here, the column comprises an outer shell and an inner shell, which are connected to each other via respective flanges and enclose a hollow space between them. In order to give the body the necessary stability both under normal operating loads and in the case of a crash, an additional reinforcement sheet is arranged in this hollow space. Disadvantageously, such multi-part sheet constructions are, however, particularly heavy, such that with the overall weight of the motor vehicle, the fuel consumption thereof, and thus exhaust emissions, also increase.

German patent document DE 10 2007 010 341 A1 describes a component in monocoque construction, in which the reinforcement element between the outer and inner shell is produced from a fiber composite plastic in order to save weight. Here, the reinforcement element is adhered to the shell. Weight can hereby be saved; the adhesion, however, increases the process time due to the setting requirements. Due to the adhesion, the structural element is also connected unreleasably to the shells.

Exemplary embodiments of the present invention are directed to a body component according that is particularly light, simple and quick to produce, as well as simple to repair.

Such a body component, in particular a column, for a motor vehicle comprises an inner shell and an outer shell made from a metal, which are connected to each other in respective flange regions and which enclose a hollow space between them. A reinforcement element having a basic body made from a fiber composite plastic is arranged in this to strengthen the body component. According to the invention, the reinforcement element comprises at least one metallic insert, by means of which the reinforcement element is connected to the inner and/or outer shell. In other words, the joining location of the reinforcement element to the shells of the body component is a metal-metal connection. Thus, an adhesion can be dispensed with and simultaneously, a more stable, reversible connection, for example by screwing or similar, can be enabled. Such a body component is therefore both particularly light and particularly procedurally reliable and quick to join and simple to repair.

In a preferred embodiment of the invention, the reinforcement element comprises two metallic inserts, which are connected to the inner and/or outer shell in the flange regions. In other words, such a reinforcement element extends transversely through the entire hollow space and connects the two flanges between the shells to each other, wherein respective metal-metal connections are provided on both connection sides. A particularly good level of stability is hereby achieved, wherein the advantages referred to above are maintained.

The inserts are preferably formed as sheet metal, which can be simple metal strips or also transformed sheet metal constructions. In both cases, the production of the inserts, as well as the connection thereof to the fiber composite plastic, can be carried out particularly simply and cost-effectively.

An example of this is the overmolding of the inserts with the fiber composite plastic, wherein at least one through opening or a similar positive-fit element is expediently provided in the inserts in order to ensure a stable and reliable interlocking between the plastic matrix and the insert part. As well as the simple overmolding, other methods are obviously also conceivable. For example, the insert parts can also be embedded into the reinforcement element in the course of resin transfer molding or during production of the fiber composite component in the course of a sheet molding compound process.

Expediently, the reinforcement element has further reinforcement fibers made from a metal. These extend expediently through the entire body of the reinforcement element, in order to give this particularly high strength.

Simultaneously, the provision of such metal reinforcement fibers enables a subsequent connection of the inserts to the reinforcement element, for example by welding or soldering, such that the inserts do not have to be embedded fixedly into the plastic matrix. The reinforcement fibers can also be overmolded in a simple manner with the fiber-reinforced plastic or, however, can be connected to the plastic matrix in the course of resin transfer molding or the production of a sheet molding compound.

In a further embodiment of the invention, the reinforcement element has a substantially S-shaped cross-sectional profile. Hereby, it can be supported on the shell inner walls by its plastic region and thus ensures particularly good strengthening, wherein the soft support simultaneously prevents potential flapping during movements of the reinforcement element.

BRIEF DESCRIPTION OF THE DRAWING FIGURES

Figure 2:
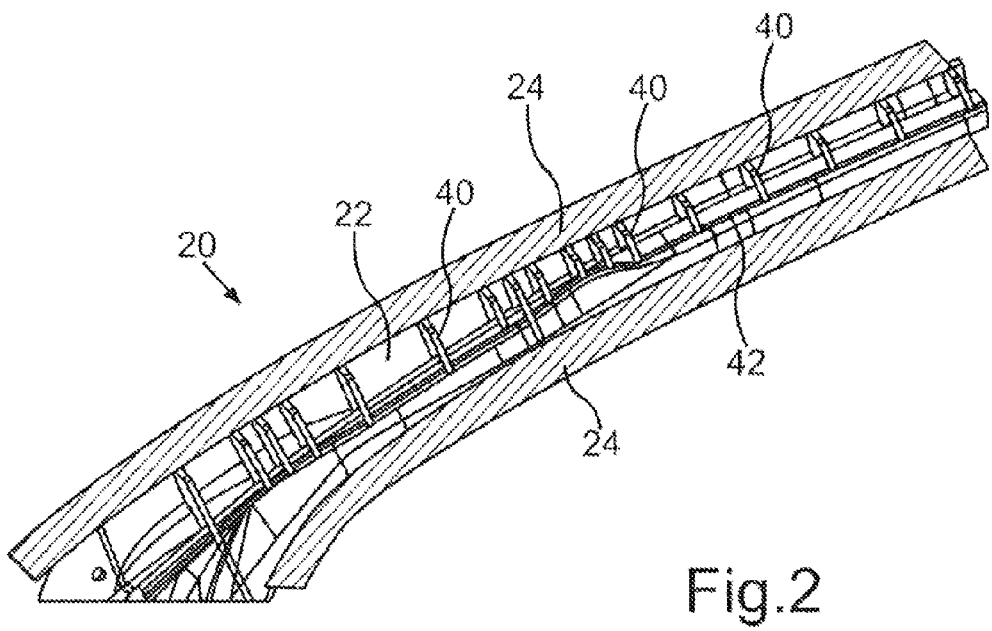

Below, the invention and its embodiments are explained in more detail by means of the drawing. Here are shown:

FIG. 1 a sectional depiction through an exemplary embodiment of a body component according to the invention and FIG. 2 a side view of a reinforcement element for an exemplary embodiment of a body component according to the invention.

DETAILED DESCRIPTION

A column, referred to by 10 throughout, for a motor vehicle comprises an outer shell 12 and an inner shell 14, which are produced from steel or aluminum sheet metal. The shells 12, 14 are connected to each other in respective flange regions 16 and enclose a hollow space 18 between them. A reinforcement element 20 is arranged in the hollow space 18. This comprises a basic body 22 made from a fiber-reinforced plastic, into which angled metal strips 24 are inserted. The metal strips 24 extend into the flange regions 16 with their end regions 26 and are there connected to the inner shell 12 and the outer shell 14.

As well as reinforcement fibers made from plastic, the basic body 22 comprises further additional metallic reinforcement fibers 28. The basic body 22 of the reinforcement part 20 is formed to be S-shaped and comprises a central part 30 as well as lateral arms 32, 34. Therein, the arms 32, 34 engage with the inner walls 36, 38 of the outer shell 12 and the inner shell 14, such that a particularly good support effect is achieved and flapping is avoided.

As is clear in the side view of the reinforcement part 20 in FIG. 2, the metal strips 24 extend over the entire length of the reinforcement part 20 and are therefore also connected to the flanges 16 over the entire length thereof. The basic body 22, made from fiber-reinforced plastic, has a structure made from reinforcement ribs 40, which are not all referred to for the sake of the overview. Furthermore, a bulge 42 extends over the entire length of the basic body 22, which likewise serves for further strengthening.

Due to the sheet metal structures 24, a conventional joining of outer shell 12, inner shell 14 and strengthening part 20 is enabled, which can occur, for example, by welding, soldering, riveting or clinching. Releasable connection techniques, such as, for example, screwing, can also be used. The metallic reinforcement 28 can likewise be joined to the sheet metal 24 separately, for example by welding or soldering. In particular, metal wires, nets, fabrics, webs, cables, bands, rovings or strips can be used as a metallic reinforcement 28.

For the production of the reinforcement element 20, known methods of fiber composite technology can be used. The reinforcement fibers and metallic reinforcement elements 28 can, for example, be overmolded simply with plastic or a hybrid mass made from short fiber-reinforced plastic. Sheet molding compound (SMC) or resin transfer molding (RTM) methods can also be used. Herein, the metal strips 24 can be integrated immediately, directly into the plastic matrix, such that these can be overmolded in the same procedure and in the same tool as the fiber inserts. For this purpose, the fiber reinforcement 28 can already be fixedly connected to the metal strips 24 before the overmolding. Furthermore, in the metal strips 24, further holes, undercuts or similar can be provided, which ensure a fixed interlocking between the metal strips 24 and the plastic matrix of the basic body 22. The metal strips 24 can obviously also be integrated into the SMC or RTM process as prepregs or preforms together with the fiber insert 28. Therein, the fixed connection of fiber inserts 28 and metal strips 24 can be required, if necessary, in the prepreg formation, whilst this is not necessary in the formation of a preform, as there the melted and solidifying matrix mass fixedly encloses the metal strips in the consolidation.

Overall, such a column 10 is created, which manages with particularly few individual components, integrates particularly simply, stably and cost-effectively into steel/aluminum shells in a fiber composite hybrid reinforcement, and enables the use of conventional joining techniques. Compared to conventional reinforcements made from steel or aluminum, a particularly high E-module can be achieved using the reinforcement element 20, which, with a column 10, in turn leads to an improved utilization of material and a particularly high weight reduction and a low $CO_2$ emission of the motor vehicle connected to this.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A body component, comprising:
an inner shell having flange regions;
an outer shell having flange regions, wherein the inner and outer shells are metal, are connected to each other in the flange regions, and enclose a hollow space between them; and
a reinforcement element having a fiber composite plastic basic body arranged in the hollow space to strengthen the body component,
wherein the reinforcement element comprises at least one metallic insert, which connects the reinforcement element to the inner or outer shell in the flange regions,
wherein the body component is a motor vehicle column.

2. The body component of claim 1, wherein the reinforcement element comprises two metallic inserts, which are connected to the inner or outer shell in the flange regions.

3. The body component of claim 2, wherein the two metallic inserts are sheet metal inserts.

4. The body component of claim 2, wherein the two metallic inserts are overmolded with fiber composite plastic of the reinforcement element.

5. The body component of 4, wherein the two metallic inserts have at least one through opening.

6. The body component of claim 1, wherein the reinforcement element has further metal reinforcement fibers.

7. A body component, comprising:
an inner shell having flange regions;
an outer shell having flange regions, wherein the inner and outer shells are metal, are connected to each other in the flange regions, and enclose a hollow space between them; and
a reinforcement element having a fiber composite plastic basic body arranged in the hollow space to strengthen the body component,
wherein the reinforcement element comprises at least one metallic insert, which connects the reinforcement element to the inner or outer shell in the flange regions,
wherein the body component is a motor vehicle column,
wherein the reinforcement element has further metal reinforcement fibers,
wherein the further reinforcement fibers are welded or soldered to the two metallic inserts.

8. The body component of claim 1, wherein the reinforcement element has an S-shaped cross-sectional profile.

9. The body component of claim 1, wherein:
the flange regions of the inner shell include a first inner shell flange arranged on a first end of the inner shell and a second inner shell flange arranged on a second end of the inner shell;
the flange regions of the outer shell include a first outer shell flange arranged on a first end of the outer shell and a second outer shell flange arranged on a second end of the outer shell; and
the at least one metallic insert is arranged between the first inner shell flange and the first outer shell flange or between the second inner shell flange and the second outer shell flange.

* * * * *